(No Model.)

F. K. IRVING.
PROCESS OF PRODUCING OZONE.

No. 596,936. Patented Jan. 4, 1898.

WITNESSES:
John A. Bergstrom
J. F. Kay

INVENTOR
Frank K. Irving
BY
W. P. Hutchinson
ATTORNEY.

UNITED STATES PATENT OFFICE.

FRANK K. IRVING, OF PASSAIC, NEW JERSEY, ASSIGNOR TO THE OZONOL COMPANY, OF NEW JERSEY.

PROCESS OF PRODUCING OZONE.

SPECIFICATION forming part of Letters Patent No. 596,936, dated January 4, 1898.

Application filed March 19, 1897. Serial No. 628,230. (No specimens.)

*To all whom it may concern:*

Be it known that I, FRANK K. IRVING, of Passaic, in the county of Passaic and State of New Jersey, have invented certain new and useful Improvements in Processes of Producing Ozone, of which the following is a full, clear, and exact description.

My invention relates to improvements in the production of ozone. It has been found that the action of ozone on the blood renews the latter and frees it of its impurities, and hence it follows, as is well understood by those conversant with this subject, that the action of ozone on the blood is extremely beneficial in the treatment of micro-organic diseases. Heretofore it has been a difficult and somewhat expensive matter to produce ozone, and owing to the unstable qualities of the gas it has been found difficult to combine or control it so as to enable it to be advantageously administered to patients.

The object of my invention is to produce an extremely simple and inexpensive process of making ozone and to also produce an apparatus which is easily carried about and operated, all to the end that ozone may be inhaled by the patient, so as to bring the ozone into direct communication with the blood through the medium of the lungs, and, further, to produce the ozone in a simple manner and in such quantities that it can be combined with a suitable medium.

To these ends my invention consists of certain improvements in the production of ozone and in an apparatus for such production, all of which will be hereinafter specifically described and claimed.

Reference is to be had to the accompanying drawings, forming a part of this specification, in which similar letters and figures of reference indicate corresponding parts in all the views.

Figure 1:
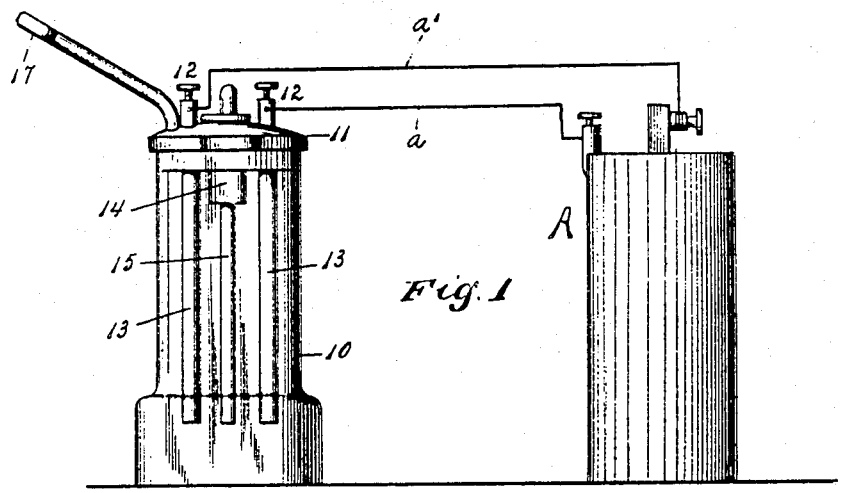
Figure 2:
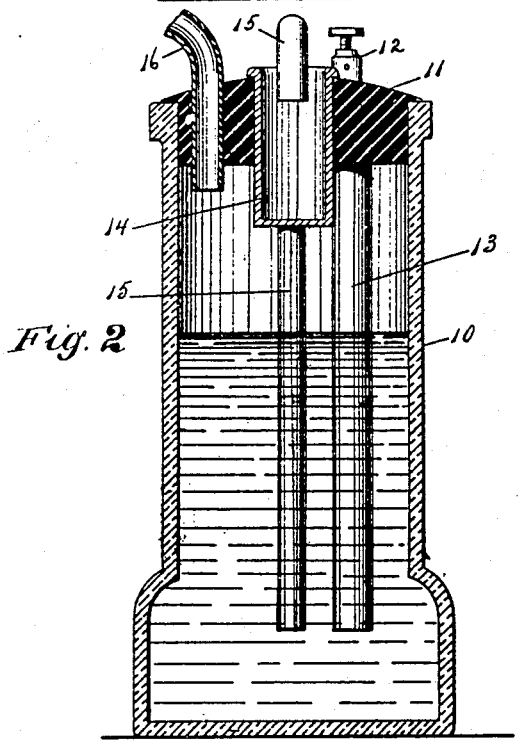
Figure 3:
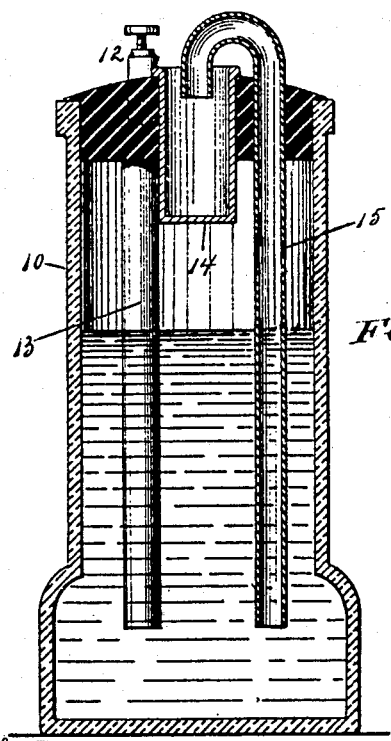
Figure 4:
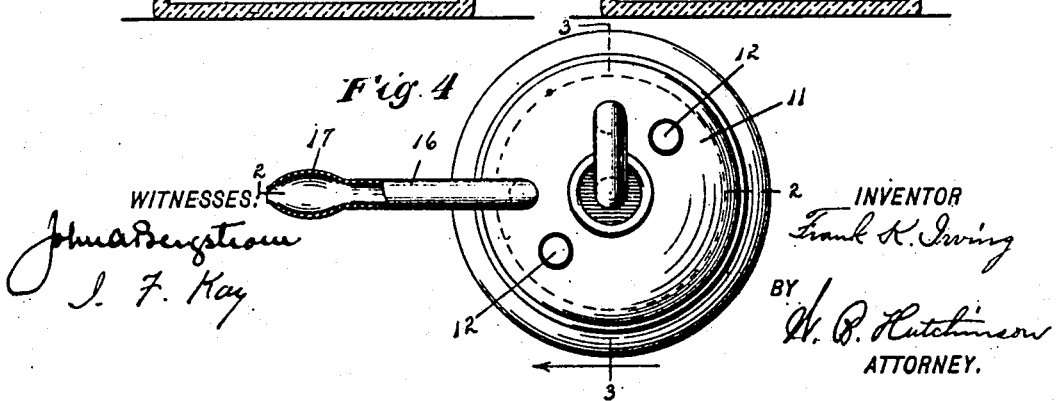

Figure 1 is a side elevation of a convenient form of the apparatus embodying my invention. Fig. 2 is an enlarged detail vertical section, on the line 2 2 of Fig. 4, of a form of cell which is adapted to the easy production of ozone. Fig. 3 is a vertical section, on the line 3 3, of Fig. 4 of the cell referred to, and Fig. 4 is a broken plan view of the cell.

From the description which immediately follows it will be clearly understood that my invention is not limited to any precise form of apparatus, any particular means of producing the electric current necessary for the electrolytic action hereinafter referred to, nor any specific form of cell to contain the electrolyte; but I have illustrated and will describe a form of the apparatus which can be easily transported and which is suitable for the production of the ozone and convenient for administering it.

The ordinary glass cell 10 has a removable insulating-top 11, which has binding-posts 12 or equivalent devices connecting with the poles or electrodes 13, which are adapted to be immersed in the electrolyte contained in the cell. These electrodes may be of any suitable form and may be of various materials; but the oxidizing action of the ozone is so great that the usual metals or compositions do not well withstand that action, and I have found that a composition of lead and antimony is best suited to this purpose. I do not, however, limit my invention to the use of such pole-pieces or electrodes. The top 11 is also shown provided with the ordinary cup 14 and siphon-pipe 15, which have nothing whatever to do with my invention and are shown merely because such cells frequently have these attachments to enable different substances to be conveniently mingled with the liquor in the cell and inhaled. The top 11 is also perforated to receive an inhaling-tube 16, which is flattened or expanded at its outer end, as shown at 17, so that it can be held conveniently in the mouth; but it will be understood that various shapes of tubes are necessary for insertion in the mouth, nostrils, throat, &c.

In carrying out my invention I use, by preference, as an electrolyte sulfate of copper on account of its low counter electromotive force, thus enabling a relatively small current to be used effectively; but it will of course be seen at once that other liquids and a strong current can be used without in the least affecting the principle of the invention. The binding-posts 12 or equivalent connections are adapted to connect with suitable wires $a$ and $a'$, leading to a battery A or other source of electricity. When the current is turned on and the electrodes or pole-pieces 13 are immersed in the electrolyte, the electrolytic action which is set up decomposes the liquid, the ozone being produced at the positive pole, evolution of hydrogen being suppressed in accordance with the following chemical reaction:

$$CuSO_4 + 2H = H_2SO_4 + Cu,$$

ozone being set free. The tube can be applied to the mouth, throat, or nostrils, as referred to, or the generated ozone can be combined with a suitable menstruum, such as glycerin, for other uses.

Where ozone is produced by the ordinary methods—that is, by the silent discharge or by the decomposition of water—it is not suitable for use in the manner I have pointed out, because in the first instance a small quantity of nitrous oxid is produced with the ozone and in the latter case the water is resolved into nascent oxygen and hydrogen, so that in both cases a deleterious matter remains and so unfits the ozone for use; but when a metallic solution, as sulfate of copper or zinc, is used the deposition of the metal serves as a carrier for the hydrogen, and so no hydrogen is set free, but a mixture of oxygen and ozone is liberated. It will also be observed that by producing the ozone in a close vessel, as described, it can be conveniently inhaled or liberated, as desired, or can be conveyed into a suitable menstruum, such as equal parts of glycerin and distilled water, for a combination.

Having thus described my invention, I claim as new and desire to secure by Letters Patent—

The herein-described process of producing ozone, which consists in subjecting to electrolytic action a solution of a metallic salt the base of which is reducible and thereby serves to dispose of the hydrogen by secondary action during electrolysis, and then conveying the freed ozone into a suitable menstruum.

FRANK K. IRVING.

Witnesses:
ALBERT B. CROUNSE,
PERCY N. KIP.